April 22, 1952 — S. W. FAUST — 2,593,740

VALVE SEALING ASSEMBLY

Filed Aug. 6, 1949

Inventor
Stewart W. Faust,
By Wilkinson, Huxley, Byron & Hume
Attorneys.

Patented Apr. 22, 1952

2,593,740

UNITED STATES PATENT OFFICE 2,593,740

VALVE SEALING ASSEMBLY

Stewart W. Faust, Newton, Iowa, assignor to The Maytag Company, Newton, Iowa, a corporation of Delaware Application August 6, 1949, Serial No. 108,898

2 Claims. (Cl. 251—160)

1

This invention relates to valve constructions, more particularly to valve constructions embodying resilient type sealing elements and it has for an object to provide improved means for anchoring the same in position and for limiting distortion of the sealing element.

In some valve assemblies the lower end of the valve stem is recessed to provide a cylindrical wall and a flat inner end wall, and a resilient sealing element comprising a base with an integral annular depending sealing lip is secured within the recess by means of a washer and screw. During assembly, should the screw be tightened beyond a definite amount it compresses the base of the seal between the washer and the inner end wall of the recess and causes a portion of the base to extrude around the outer edge of the washer. This extrusion results in elongation and distortion of the depending sealing lip and may cause the same to fold inward over the washer. If the extrusion is too great the sealing lip is no longer effective to properly seal against the flow of fluid.

Accordingly, it is an object of the invention to provide an improved resilient sealing element assembly of the self-sealing type whereby elongation of the sealing lip is reduced to a minimum.

It is another object of the invention to provide an improved resilient sealing element assembly wherein a portion of the inner end wall of the recess is relieved to provide an anchoring corner and to accommodate the material extruded from the base of the sealing element when it is secured in position.

It is another object of the invention to limit the elongation of the sealing lip of a resilient type sealing element by providing an annular tapered serration with an outer corner in the inner end wall of the recess for receiving the extruded portion of the base when the sealing lip is secured in position.

Other objects, features, capabilities, and advantages are comprehended by the invention as will later appear and as are inherently possessed thereby.

Referring to the drawings.

Figure 2:
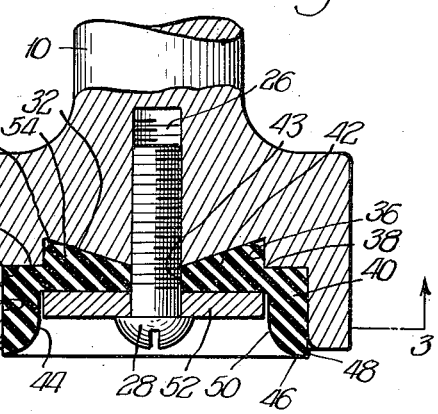
Figure 2 is a partial enlarged vertical sectional view of the seal assembly shown in Figure 1.
Figure 4:
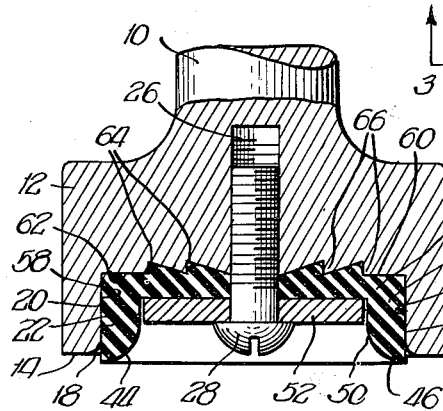
Figure 5:
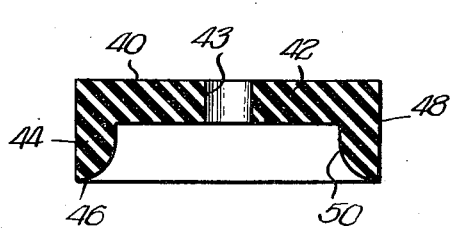

2 element removed to show the annular serration in the valve stem more in detail;

Figure 4 is a vertical sectional view similar to Figure 2 of a seal assembly in which a pair of annular serrations is incorporated; and Figure 5 is a vertical cross-sectional view of the resilient sealing element prior to assembly.

Figure 1:
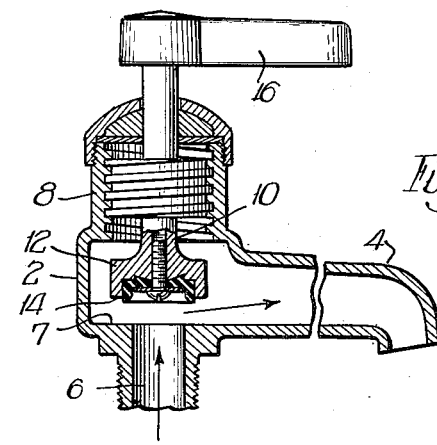
Figure 1 is a vertical cross-sectional view of a valve for fluids incorporating a resilient sealing element and the anchoring means therefor constructed in accordance with the present invention.
Figure 3:
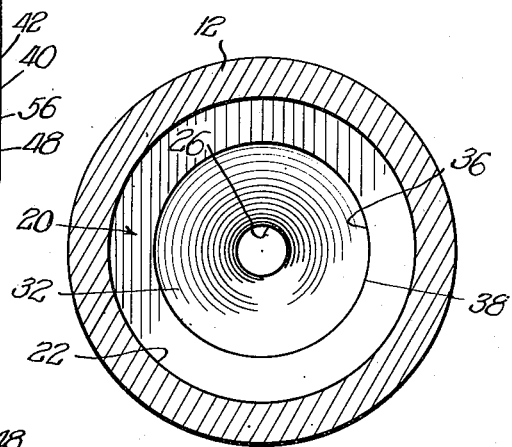
Figure 3 is a horizontal sectional view taken on the line 3—3 of Figure 2 with the sealing

Referring now more in detail to the drawings, an embodiment selected to illustrate the invention is disclosed in Figures 1 to 3 of the drawings as comprising a faucet formed with a body member 2 having a spout or nozzle 4 for the discharge of liquid entering the body member through a passage or inlet 6 with a flat radial valve seat 7 disposed about the inner end of the passage 6. In this instance, the body is formed with an upper extension 8 internally threaded in alignment with the passage 6 to receive a threaded valve stem or plunger 10 provided with an enlarged lower end portion 12 having thereon a flat radial annular bottom abutment surface 14 disposed opposite to and facing the valve seat 7. A handle 16 is connected to the upper end of the plunger whereby the plunger may be rotated for moving the same longitudinally into and out of its closed position with respect to the valve seat 7 to cover the passage 6 in the valve body. The annular abutment surface 14 on the bottom of the plunger is adapted to engage the seat 7 to constitute a positive stop for the plunger when it is moved to its closed position. Also, the inside corner of the abutment surface is rounded slightly at 18 for a purpose to be hereinafter described.

The lower end 12 of the plunger has a recess 20 formed therein which is provided with a cylindrical side wall 22 defining the inner boundary of the abutment surface 14 and an inner end wall 24 facing in the direction of the seat and the passage 6. The inner end wall 24 of the recess is centrally tapped at 26 for receiving the threaded end of a machine screw 28 or other securing means, and is formed with an annular relief or serration 30 having a surface 32 tapering upwardly and outwardly from the tapped opening 26 and terminating short of the side wall 22 and an annular flat radial support surface 34, parallel with the abutment surface 14, disposed between the side wall 22 and the outermost diameter of the serration. As shown in the drawings, the outermost diameter of the serration has a cylindrical wall 36 which defines a sharp corner or anchoring edge 38 with the annular support surface 34.

Disposed within the recess 20 is a flexible and resilient sealing element 40 of the self-sealing type formed of, for example, rubber, synthetic rubber, or the like. As shown in Figure 5 the sealing element comprises a flat disc-shaped bottom or base portion 42, having a central opening 43 through which a portion of the screw 26 extends, and its outer edge is provided with an integral annular depending body portion defining a sealing lip 44, the rounded lower or free end 46 of which extends slightly beyond the abutment surface 14. The major portion of the outer wall 48 of the annular sealing lip 44 is disposed adjacent to and supported by the side wall 22 of the recess and the inner wall 50 is adapted to be acted upon by the liquid under pressure which, together with the screw 28 serves to maintain the sealing element in position. When inserted in the recess, prior to securing or anchoring, the base 42 of the sealing element 40 only engages or contacts the annular supporting surface 34 and the edge about the tapped opening 26, thus leaving a space between it and the tapered wall 32 of the serration. In order to equally distribute the compression force of the screw 28, a flat washer or retainer 52 fitting within the space defined by the inner wall 50 of the depending sealing lip is placed over the base portion 42 of the sealing element and is held or secured therein by means of the screw. Also, it is to be noted that the outer diameter of the washer 52 and the diameter of the cylindrical wall 36 of the serration are approximately equal so that when the screw is tightened the major portion of the material forming the sealing element which is extruded is forced into the space provided by the serration and not outwardly around the edge of the washer.

It will be apparent that in assembling a flexible sealing element in the manner above described, should the screw 28 be tightened beyond a definite limit a compressive force is applied between the bottom 24 and the washer 52 to compress or squeeze the resilient base 42 of the sealing element therebetween. As the washer is tightened and the material begins to extrude or flow into the serration 30 directly under the washer the sharp edge 38 locks the base 42 of the sealing element in place, thereafter the major portion of the extrusion is into the serrated portion 30 as indicated at 54 and not outwardly toward the sealing lip. This construction permits the sealing element to be securely locked in position while at the same time does not materially distort or effect the position or elongation of the sealing lip 44. It appears that any tendency of the sealing edge 46 to move inward by turning about the corner 38 is counteracted by the tendency of the resilient material in the base to move radially outwardly due to the tapered portion of the serration.

In the operation of a resilient sealing element of this type when the plunger 10 is moved toward the seal 7 the free end 46 of the downwardly projecting sealing lip 44 contacts the seat to stop the flow of liquid through the passage, and upon further movement of the plunger in the closing direction the sealing lip is compressed axially until the annular abutment surface 14 on the plunger engages the seat to limit the longitudinal compression of the sealing lip on the sealing element. This compression, plus the pressure of the liquid acting upon the exposed surface of the sealing element, causes the edge 46 to distort and fill up the space provided by the rounded corner 18 adjacent the outer wall 48 of the sealing lip, the seat 7 and abutment surface 14 on the plunger to prevent leakage through the passage, while at the same time the abutting portions of the plunger and seat prevent extrusion of the free end of the sealing lip.

Referring now to the modification shown in Figure 4, the valve stem 10, abutment surface 14, sealing element 40, screw 28, tap 26 and washer 52 are identical in construction as disclosed in the first modification. However, in this instance, the recess 56 has its inner end wall 60 modified to include a flat outer annular support surface 62 adjacent the cylindrical side wall 58 thereof and a pair of inner concentric annular serrations 64 having different diameters. These serrations provide a pair of concentric inner and outer spaces for receiving the resilient material extruded by the base 42 when the screw 28 is tightened beyond a definite limit and a double corner or anchoring construction 66 for holding the same in position to prevent or limit elongation or distortion of the sealing lip. It is to be understood that the sealing element is assembled and may be utilized in a valve construction as disclosed in the first modification. A valve assembly of this type utilizing more than one serration would be applicable under conditions wherein a sealing element having a relatively large diameter is desired.

From the foregoing it can be seen that a sealing element assembly has been provided wherein means are provided for anchoring and accommodating the material extruded by the resilient base in order to prevent distortion or elongation of the sealing lip.

While I have herein described and upon the drawings shown illustrative embodiments of the invention, it is to be understood that the invention is not limited thereto but may comprehend other constructions, arrangements of parts, details and features without departing from the spirit of the invention.

It is claimed:

1. In a sealing element assembly for sealing the flow of fluid through a passage, the combination of a plunger having a recess therein adapted to be disposed over said passage when in its closed position, said recess including a cylindrical side wall and an inner end wall, said inner end wall being provided with a centrally tapped opening and an upwardly and outwardly projecting serration terminating short of said side wall to define a sharp corner, a resilient sealing element having a base portion with a central opening therein and an annular integral depending sealing lip disposed adjacent the outer marginal edge of said base disposed in said recess to cover said inner end wall, a retainer of substantially the same diameter as said serration for covering the base portion, and a screw having a portion projecting in said tapped opening for compressing and extruding a portion of said base under said retainer into said serration whereby said sealing element is anchored in position by said sharp corner.

2. In a seal assembly, the combination of a body member with a recess therein having a cylindrical side wall and an inner end wall, said inner end wall including a centrally tapped opening, an annular support surface projecting inwardly from said side wall and an annular relief disposed between said tapped opening and support surface, the intersection of said relief and support surface defining a sharp corner, a resilient sealing element comprising a flat base portion with a centrally located opening therethrough and an integral annular sealing lip about the outer portion of said base disposed in said recess to cover said inner end wall in contact with said support surface, a washer of substantially the same diameter as said relief covering the exposed portion of said base, and a screw projecting through said base into said tapped opening for compressing said base through said washer to extrude a portion of said base into said relief to thereby limit elongation of said sealing lip.

STEWART W. FAUST.

REFERENCES CITED

The following references are of record in the file of this patent:

UNITED STATES PATENTS

| Number | Name | Date |
| --- | --- | --- |
| 607,591 | Miller | July 19, 1898 |
| 1,835,921 | Woodruff | Dec. 8, 1931 |
| 2,403,028 | Smith | July 2, 1946 |